Aug. 22, 1944.  C. F. JANACEK ET AL  2,356,673
LOCK WASHER CONSTRUCTION
Filed Dec. 16, 1942
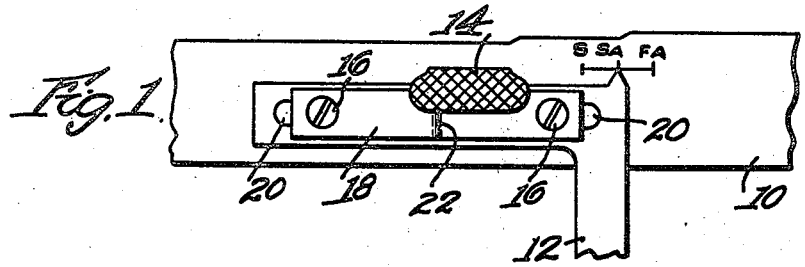
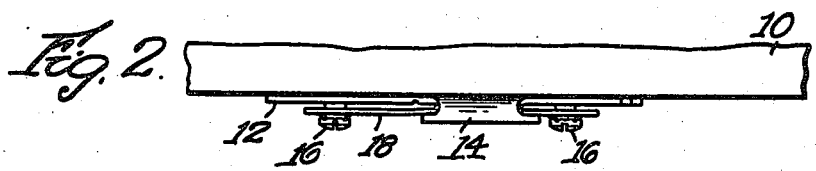
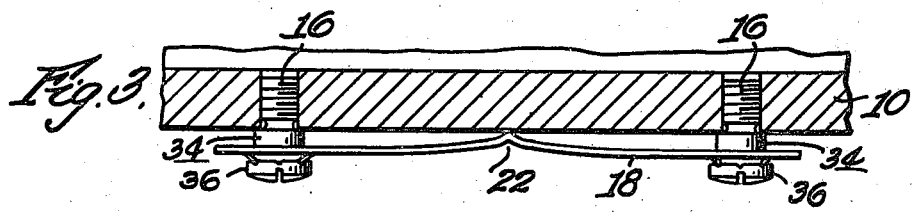
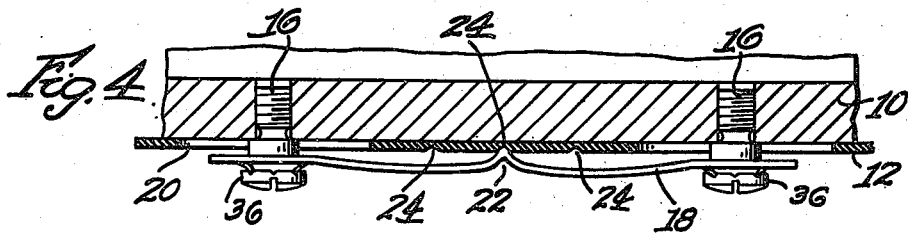
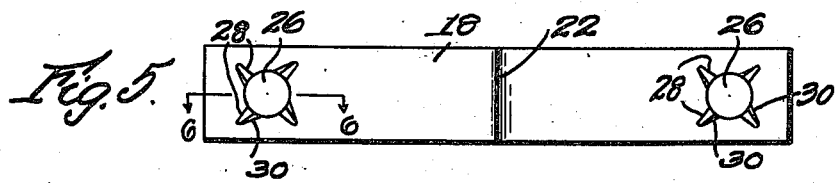
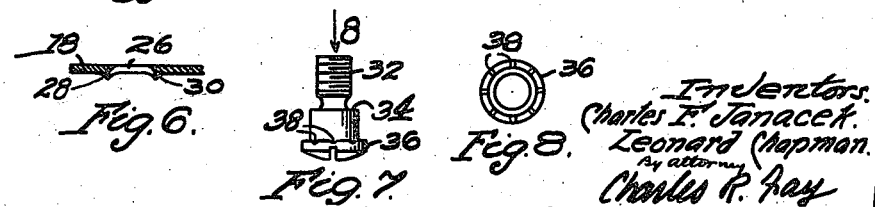

Patented Aug. 22, 1944

2,356,673

UNITED STATES PATENT OFFICE 2,356,673

LOCK WASHER CONSTRUCTION

Charles F. Janacek, Philadelphia, Pa., and Leonard Chapman, Worcester, Mass., assignors to Harrington & Richardson Arms Company, Worcester, Mass., a corporation of Massachusetts Application December 16, 1942, Serial No. 469,202

3 Claims. (Cl. 151—32)

This invention relates to lock washer construction of a general nature, but here illustrated as specifically associated with a sliding member for latching the latter in various positions of adjustment thereof.

Objects of the invention include the provision of a spring-type washer having raised teeth at a side thereof, said teeth being arranged generally radially of the bolt aperture and each tooth having a generally straight abruptly shouldered side and an inclined or cam side, the shouldered sides being located to face in the direction of securing rotation of a bolt and the cam sides being located at the opposite sides of the teeth; in combination with a bolt having a head, said head being provided with dents at its under side for cooperation with the teeth, to provide a ratchet action therewith when the bolt is inserted through the washer and turned up on a support, for easy securement of the bolt but more difficult removal thereof.

Other objects of the invention include the provision of a lock washer for bolts as aforesaid wherein the bolt is provided with a stop below the dented head to prevent complete turning up of the bolt, the washer having means to spring-press it against the dented head of the bolt to resist the tightening action thereof, said stop thereby providing an adjustable space between the bolt head and the support on which the bolt is mounted, this space being useful to provide a guideway for the reception of an element to be movably mounted on the support.

Other objects and advantages of the invention will appear hereinafter.

Reference is to be had to the accompanying drawing in which

Fig. 1 is a view in side elevation of a device embodying the present invention as applied to the safety slide of a firearm;

Fig. 2 is a plan view of Fig. 1;

Fig. 3 is an enlarged plan view of the lock washer and bolt construction of the present invention, part being in section;

Fig. 4 is a view similar to Fig. 3 but showing the slide in place;

Fig. 5 is a view in side elevation of the lock washer strip;

Fig. 6 is a section on line 6—6 of Fig. 5;

Fig. 7 is a view in elevation of the bolt, and

Fig. 8 is a view of the bolt looking in the direction of arrow 8 in Fig. 7.

We have chosen to illustrate the present invention as forming a resilient latching support for mounting a slide element which may be used as a control part for a safety mechanism of a firearm. The invention is in no way limited to this adaptation, but for purposes of clearly illustrating the principles of the invention, the present adaptation has been used.

In Fig. 1 the reference numeral 10 illustrates an element which may be any kind of support but in this case is a part of the receiver of a firearm. As shown, this receiver is marked "S" to indicate the safety position of the firearm; "SA" to indicate semi-automatic fire; and "FA" to indicate fully automatic fire. A slide 12 having a thumb piece 14 is slidably mounted on the receiver and has three positions of adjustment as indicated by the above mentioned lettering, this slide controlling the firing mechanism of the firearm for the purpose described.

We provide a guideway for the slide 12 in which is incorporated means for yieldably latching the same in any one of the three positions to which it may be slid by means of the thumb piece. This guideway comprises a pair of bolts or fasteners 16 which are threaded into the receiver in spaced condition and pass through a spring strip 18, the slide itself being provided with elongated slots 20 for the passage therethrough of the bolts. The strip 18 is adapted to resiliently press against the slide to tend to maintain it in any of its adjusted positions, and for this purpose the spring strip is formed adjacent its center with a projection 22 extending towards the slide see Fig. 4. The slide is provided with a series of cooperating notches 24 and it will be seen that as the slide is moved, the projection 22 will seat in the different notches 24 to resiliently and yieldably latch the slide in its various adjusted positions. Fig. 4 illustrates the central position of the slide, in which position semi automatic fire will be provided for as indicated in Fig. 1. If slide 12 is moved to the right one notch, fully automatic fire will be provided for and if slide 12 is moved a notch to the left from its Fig. 4 position, the firearm will be on safety.

Strip 18, in addition to its projection 22, is bowed or arched to have its ends sprung away from the support 10, i. e., the ends of strip 18 extend outwardly away from slide 12 and support 10, see Fig. 3. It will be seen that this construction provides for resiliently pressing strip 18 towards support 10 by means of bolts 16 which pass through the bolt apertures 26 at the ends of the strip, and in this way the projection 22 extends toward and is resiliently pressed against the strip 12. The more the bolts are tightened, the greater the resilient pressure against the strip. Strip 18 is provided with a series of upstanding radial teeth located around the bolt apertures 26. Each tooth is provided with an abrupt straight shouldered side 28, these shouldered sides lying at right angles to the strip and facing in the direction of tightening rotation of the bolts. The other or opposite side of each tooth is provided with an inclined cam surface 30, these cam surfaces facing in the opposite direction. The teeth as just described provide a ratchet arrangement which extends in a generally circular manner about bolt apertures 26.

Each bolt 16 comprises a threaded shank 32, an enlarged boss shouldered at 34, and a still further enlarged head 36, see Fig. 7. The head is provided with a series of radial dents 38 at its underside, these dents cooperating with the ratchet teeth on the strip 18 to allow for relatively easy turning up of the bolts against the strip, but a more difficult loosening rotation is present because of the fact that the dents will ride up the inclined cam surfaces 30 during the tightening rotation of the bolts, but the sharp shoulders 28 will tend to prevent a reverse loosening rotation thereof.

As clearly shown in Figs. 3 and 4 the bosses 34 on the bolts, although passing through slots 20, are large enough to engage the surface of support 10 to prevent entry of the bolts into the support beyond the shouldered portions of the bosses. The ends of strip 18 resiliently bear against the heads 36 and because of the bowed shape of the strip, its ends are spaced from the surface of support 10. This spacing provides for free movement of slide 12 in the region of the bolts, but since the projection 22 on strip 18 bears against slide 12, it will be clear that the latter will be resiliently and yieldably latched against support 10 thereby, and therefore a guideway is provided for the slide and at the same time a resilient latch is effective to maintain the slide in its various positions of adjustment.

The lock washer construction herein disclosed will be useful in many relations other than that here shown and it is particularly pointed out that other means may be provided to cause strip 18 to resiliently bear against the heads of the bolts. In any case, varying pressures may be exerted on the washer by the degree of turning up on the bolts, and as long as the bolts contact the washer the resilient latching action will be present regardless of whether or not the bosses 34 contact support 10. However, bosses 34 will prevent an excessive tightening of the bolts, so that the slide 12 will always be substantially free of the latching action of strip 18 except at the projection 22.

Having thus described our invention and the advantages thereof, we do not wish to be limited to the details herein disclosed, otherwise than as set forth in the claims, but what we claim is:

1. A device of the class described comprising an elongated strip having a projection at one side thereof intermediate its ends, said ends being bowed in a direction away from said one side, fasteners at each end of the strip to secure the latter to a support with the projection bearing on the support to provide a resilient thrust of said bowed strip ends against the fasteners in a direction away from the support, said strip ends being spaced from the support, and a slide located between the strip and the support.

2. A device of the class described comprising an elongated strip having a projection at one side thereof intermediate its ends, said ends being bowed in a direction away from said one side, fasteners at each end of the strip to secure the latter to a support with the projection bearing on the support to provide a resilient thrust of said bowed strip ends against the fasteners in a direction away from the support, said strip ends being spaced from the support, and a slide located between the strip and the support and resiliently held against the latter by the projection.

3. A device of the class described comprising an elongated strip having a projection at one side thereof intermediate its ends, said ends being bowed in a direction away from said one side, fasteners at each end of the strip to secure the latter to a support with the projection bearing on the support to provide a resilient thrust of said bowed strip ends against the fasteners in a direction away from the support, said strip ends being spaced from the support, a slide located between the strip projection and the support and resiliently held to the former by the latter, and a plurality of notches in the slide for selective adjustable yielding latching engagement with the projection.

CHARLES F. JANACEK.
LEONARD CHAPMAN.